Oct. 11, 1949.  P. F. MOLLOY  2,484,238
INDUCTION HEATING APPARATUS
Filed Sept. 6, 1945  2 Sheets-Sheet 1
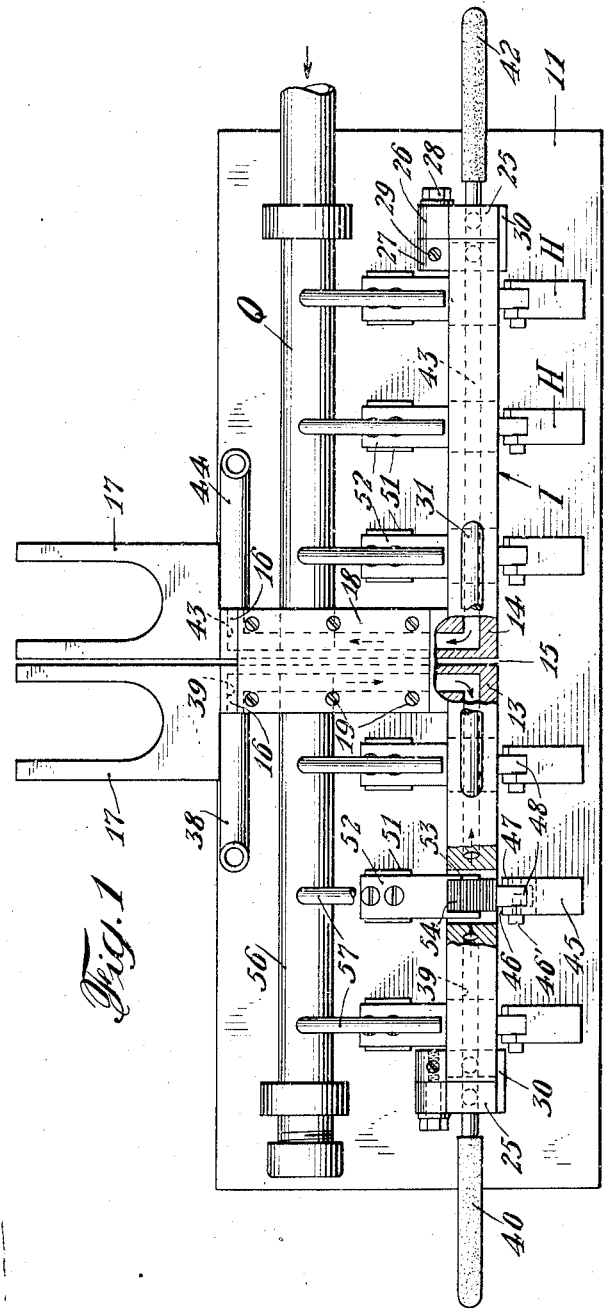
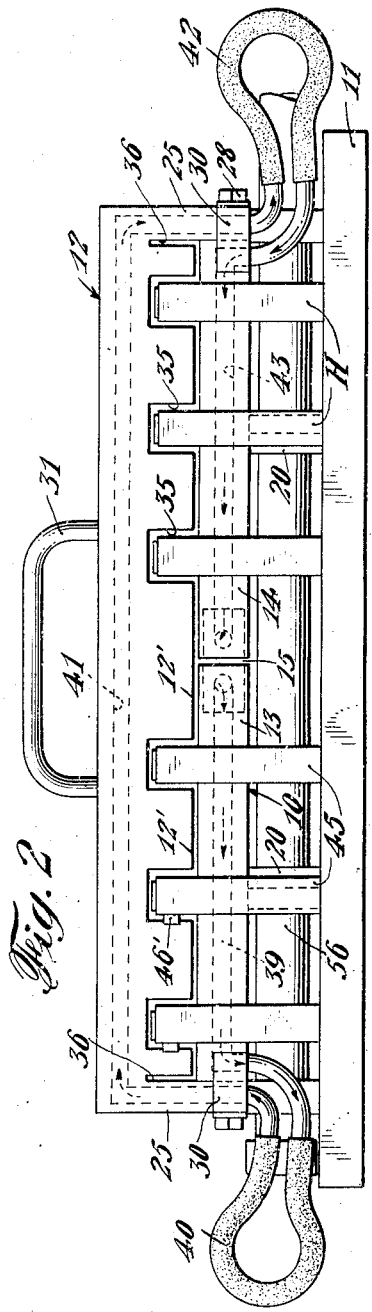
INVENTOR.
Patrick F. Molloy
BY
ATTORNEYS Oct. 11, 1949.   P. F. MOLLOY   2,484,238
INDUCTION HEATING APPARATUS
Filed Sept. 6, 1945   2 Sheets-Sheet 2
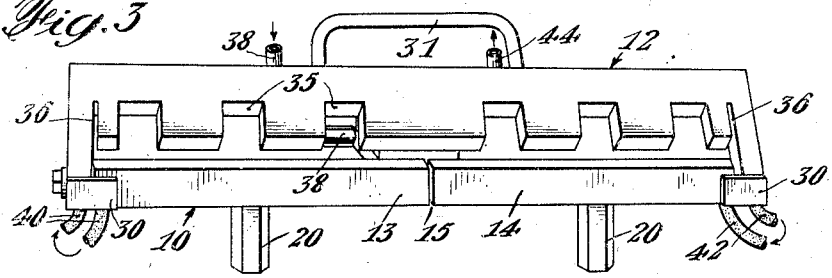
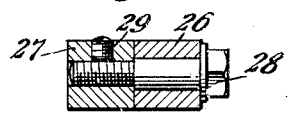
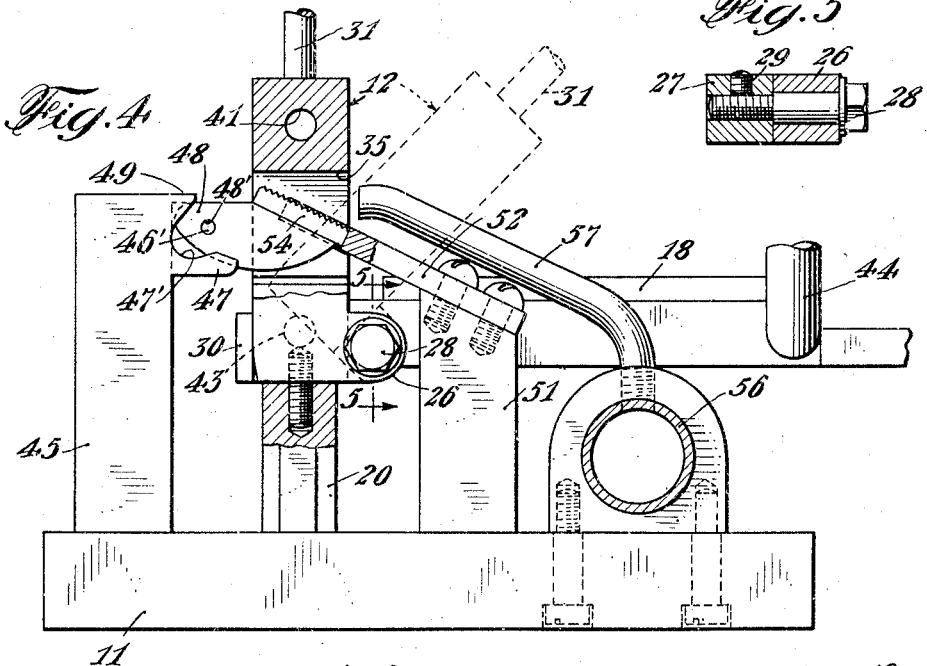
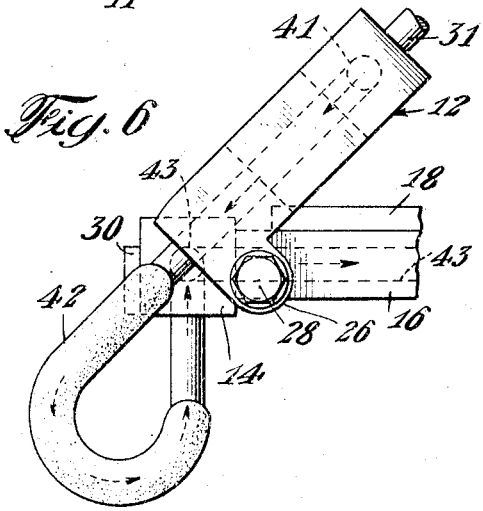
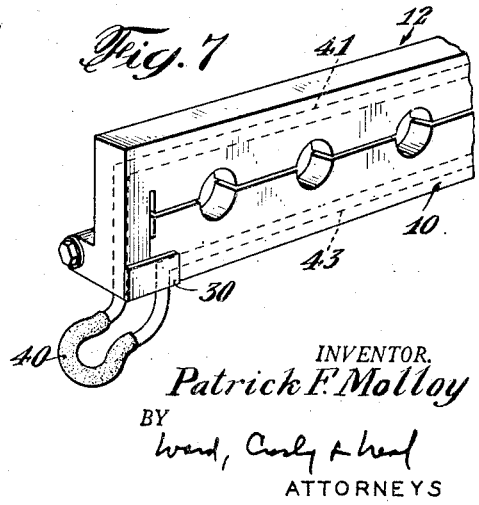
INVENTOR.
Patrick F. Molloy
BY
Ward, Crosby & Neal
ATTORNEYS Patented Oct. 11, 1949

2,484,238

UNITED STATES PATENT OFFICE 2,484,238

INDUCTION HEATING APPARATUS

Patrick F. Molloy, Long Island, N. Y., assignor to Induction Heating Corp., New York, N. Y., a corporation of New York Application September 6, 1945, Serial No. 614,650

2 Claims. (Cl. 219—47)

This invention relates to induction heating apparatus and, more particularly, to such apparatus for concurrently heating a plurality of parts or assemblies of parts which are to be brazed, hardened or otherwise treated.

An important feature of the invention resides in the provision of a two section inductor in which the two sections are relatively movable in a novel hinged relationship. When the sections of the inductor are in open position, according to one example of the invention, the component parts of a work assembly are placed in assembled relation upon each of a plurality of work holders. The sections of the inductor are then swung to closed position and, in this position, each of the assemblies is received in an opening or passage formed in the inductor wherein a strong electromagnetic field is established during passage of current through the inductor, this electromagnetic field being effective to heat and braze together the component parts of the respective work assemblies, as well as to harden the outer surfaces of the parts if desired.

After the heating is completed, a spray of water or other quenching medium may be directed against each work assembly to thereby cool and harden the respective parts thereof. The inductor sections may then be moved to open position and the assemblies removed from the inductor.

Various other objects, features and advantages of the invention will clearly appear from the detailed description given below taken in connection with the accompanying drawings forming a part of the specification and illustrating, by way of example, preferred forms of apparatus which may be used in carrying out the invention. The invention resides in such novel features, arrangements, and combinations of parts as may be shown and described in connection with the apparatus herein disclosed.

In the drawings:

Fig. 1 is a top plan view, partially in section, of the apparatus of the present invention;

Fig. 2 is a front elevational view of the apparatus shown in Fig. 1;

Fig. 3 is a front view of the inductor with the inductor sections in open position;

Fig. 4 is an enlarged end elevational view, partially in section, of the apparatus shown in Fig. 1;

Fig. 5 is a detailed view showing one of the pivots for the inductor;

Fig. 6 is an enlarged end view of the inductor with the parts in the position shown in Fig. 3; and Fig. 7 is a perspective view of a modified form of inductor.

Referring to the drawings in detail and particularly to Figs. 1 and 2, the apparatus as shown comprises an inductor I having a lower stationary section 10 fixed to a base 11 and an upper movable section 12 which may be pivotally mounted on the lower section 10. The stationary section 10 may comprise a pair of longitudinally-aligned conductors 13 and 14, the facing ends of which are separated by an air gap as at 15, such ends being connected, in a known manner, to the respective secondary terminals (not shown) of a suitable high frequency transformer by a pair of spaced conductors 16, 16 provided with attaching lugs or terminals 17 and 17, respectively. The conductors 16, 16 may be secured to an insulating strip 18 as by screws 19 to maintain said conductors in closely-spaced parallel relationship. Each of the conductors 13 and 14 may be secured to a supporting post 20, Figs. 3 and 4, which, in turn, may be secured to the base 11 in any suitable manner so that the stationary section 10 is rigidly mounted upon the base 11.

The movable section 12 of the inductor may be hinged at each end thereof to the stationary section 10 so that the parts may be moved to the open position shown in Figs. 3 and 6 to allow the work to be assembled within the inductor in the manner hereinafter described. The movable section is then swung to the closed position shown in Figs. 1 and 2 before the heating operation starts. To provide pivoting means for the movable section 12, the same may be shaped to form downwardly extending projections 25 at each end thereof, Fig. 2, and lugs 26, Fig. 1, are formed on the lower portions of the projections 25, said lugs being in alignment with lugs 27 formed on the adjacent conductor 14. Referring to Figs. 1 and 5, hinge pins 28 extend through suitable aligned passages in the lugs 26 and 27, the passages in lugs 27 being internally threaded to receive a threaded portion of the associated hinge pin 28 which may be held in the position shown in Fig. 5 by a suitable set screw as at 29.

Swinging movement of the upper section 12 in a counter-clockwise direction, Fig. 4, may be limited by stop members 30 and 30, Fig. 1, which are mounted, respectively, at the ends of conductors 13 and 14. Swinging movement of the upper section 12 in a clockwise direction, Fig. 4, may be limited by engagement of said upper section with the insulation strip 18. A handle may be provided as at 31 to facilitate moving the upper section 12 with respect to the stationary section 10.

The movable section 12 may be shaped to form a plurality of openings 35, Fig. 2, hereinafter refered to as heating zones which, in the example shown, are of rectangular cross section. Each of these heating zones is adapted to receive and inductively heat a work assembly as will be hereinafter described. When a high frequency alternating voltage is applied to the lugs 17, 17 and the movable section 12 is in closed position, current flows through the inductor to thereby establish an intense high frequency electromagnetic field within the heating zones. In order to establish a uniform field intensity in each of the heating zones, the movable section 12 may be shaped to form a narrow vertically extending slot 36 at each end of the inductor. The slots 36 serve to space the regions of increased field strength at the respective opposite ends of the inductor away from the end heating zones so that the field strength is substantially the same in each zone. Excessive induction between opposite portions of the inductor is prevented by making the slots 36 quite narrow and by forming the upper section 12 so that, except for the area defined by the heating zones 35, the lower surfaces 12' are quite close to the conductors 13 and 14 when the inductor is in closed position. As shown, there is a group of three heating zones 35 at each side of the inductor and these disposed symmetrically with respect to the center of the inductor.

The necessary cooling system for the inductor may comprise an inlet pipe 38, Fig. 1 which communicates with one end of a passage 39 extending through the adjacent conductor 16 and the conductor 13. The other end of the passage 39 may be connected by a flexible hose 40 to one end of a passage 41 which extends through the upper section 12. The other end of the passage 41 may be connected by a flexible hose 42 to one end of a passage 43 which extends through the conductor 14 and the adjacent conductor 16 to an outlet pipe 44. Accordingly, it will be apparent that a continuous stream of cooling fluid may be passed through the inductor to prevent undesirable overheating thereof.

In accordance with the invention, a work holder H may be disposed adjacent each of the openings 35. Each of these work holders is adapted to receive a plurality of parts which are to be brazed or soldered together to form an assembly. In the example shown, the work holder is adapted to receive a jaw face and a plier shank and hold these parts in proper assembled relation during the heating operation but it is to be understood that the invention is not to be restricted to the particular example shown, as work holders may be devised for holding the component parts of various other types of assemblies.

Referring to Fig. 4, each work holder may comprise a support 45 suitably secured to the base 11. A pair of side pieces 46 and 47, Fig. 1, are formed at the top of this support and a pin 46' extends through the side piece 46 into the space between the side pieces. With the movable section 12 in the dotted line position shown in Fig. 4, a plier shank 48 may be inserted into the space between the side pieces 46 and 47, the butt of such shank passing through a recessed portion 47' formed in the side piece 47. The shank is initially placed so that the pin 46' extends into a passage 48' formed in the shank. The latter is then released whereupon it drops to the position shown in Fig. 4, and engages a flange 49 formed at the top of the support 45. In this manner, the plier shank is securely held in the full line position shown in Fig. 4 by the pin 46' and the flange 49. A support 51 mounted on the base 11 may carry a yoke member 52 having a forked end portion 53 which is of the proper size to receive a jaw face 54 and support this part in proper assembled position with respect to the plier shank 48. It will be noted that the fork 53 is sufficiently large that it does not interfere when the plier shank is dropped into position in the manner hereinbefore described. It will be apparent that the jaw face 54 and the portion of the plier shank in contact therewith are disposed within the adjacent heating zone 35 when the movable section 12 is swung to closed position.

Quenching apparatus Q is provided to direct a stream of quenching fluid upon the assembly after the brazing operation is completed. This apparatus may include a conduit 56 supported by the base 11 and extending longitudinally thereof. This conduit may be supplied with quenching fluid from any suitable source, not shown. A plurality of pipes 57, one for each work holder, branch from the conduit 56 and each pipe is adapted to direct a jet quenching fluid upon the adjacent jaw face-plier shank assembly when it is supported by the work holder H in the position shown in Fig. 4.

The operation may be briefly summarized as follows. After the assembly of parts to be heated is arranged as above described, in the work holder, a brazing or soldering compound and a suitable flux are placed on the assembly adjacent the joint between the plier shank and the jaw face. Thereupon, the upper section 12 is moved to the closed position, cooling fluid being circulated through the inductor in the manner previously described. A suitable high frequency current is applied to the lugs 17, 17, with the result that a very intense electromagnetic field is established within each of the heating zones 35 and the jaw face-plier shank assembly is inductively heated to the desired temperature in a very short period of time so that the parts of the assembly are rapidly brazed or soldered together. As soon as the brazing operation is completed, the current is turned off and quenching fluid is passed through the conduit 56 and pipes 57 so that a jet of fluid is sprayed upon each of the brazed assemblies to cool and harden the same. Thereupon, the upper section 12 is moved to open position and the assemblies are removed.

It will be understood that the parts of the respective assemblies are very accurately fitted together as the parts are held in the exact position desired by the respective work holders. Moreover, since the magnetic field is of substantially the same strength in each of the heating zones 35 very uniform results are obtained which are easily reproducible by controlling the heating time. The speed of operation is greatly increased by providing the movable upper section 12 since this allows adequate working space for assembling the parts in proper position inside the inductor. From Figs. 3, 4 and 6, it will be apparent that the position of the hinge axis for section 12 is to the rear of section 10 and in a position such that the work holders are freely accessible and unobstructed when the section 12 is swung back.

It will be apparent that the shape of the heating zones may be varied, if desired, so that the inductor may be used for heating other types of assemblies. Thus, for example, the heating zones may be of circular cross-section, as shown in Fig. 7, and each heating zone may be defined by facing semi-circular recesses formed, respectively, in the movable and stationary sections of the inductor. Whether the work piece openings are formed entirely by recesses in one of the sections or by recesses in both sections, it will be apparent that the "adjacent faces" of the sections as referred to in the appended claims are shaped to form the desired work piece openings.

While the invention has been described with respect to present preferred embodiments which have given satisfactory results, and certain modifications have been referred to, it will be understood by those skilled in the art, after understanding the invention, that various other changes and modifications may be made without departing from the spirit and scope of the invention and it is intended, therefore, in the appended claims to cover all such changes and modifications.

What is claimed as new and desired to be secured by Letters Patent, is:

1. In high frequency induction heating apparatus, an inductor comprising an elongated stationary inductor portion, another elongated inductor portion hingedly connected at its ends respectively to the ends of said stationary portion, said stationary portion being formed with a transverse gap intermediate its ends, means for connecting the terminals of a source of high frequency current to opposite sides of said gap, the normally adjacent longitudinal faces of said two portions being shaped to form transverse openings in the inductor at each side of said gap for receiving work pieces, such openings being interconnected by narrow slots whereby a current path surrounding said openings is provided to extend from one side of said gap along one part of said stationary portion through a hinge connection to the other inductor portion, thence to and through the other hinge connection and the other part of the stationary portion back to the gap, the axis of said hinge connections being generally parallel to the inductor portions and said axis being positioned and said portions being so constructed and arranged as to permit the hinged inductor portion to be swung to freely expose said adjacent longitudinal faces to facilitate insertion of work pieces in said openings, and to permit the hinged portion to be swung back to bring such faces at the openings into closely spaced coupling with the work.

2. In high frequency induction heating apparatus, an inductor comprising a pair of elongated inductor portions normally positioned to extend horizontally in closely spaced relation one above the other, the adjacent faces thereof being shaped to form a plurality of transverse openings therebetween for receiving work pieces, pivotal connection means interconnecting said portions adjacent their ends, the axis of said pivotal means being generally parallel to the inductor portions and offset rearwardly of the lower portion to permit the upper portion to be swung back with respect to the lower portion to freely expose said adjacent faces at the openings to facilitate insertion of work pieces, and means for connecting said portions in series with a source of high frequency current.

PATRICK F. MOLLOY.

REFERENCES CITED

The following references are of record in the file of this patent:

UNITED STATES PATENTS

| Number | Name | Date |
| --- | --- | --- |
| 1,776,607 | Younghusband | Sept. 23, 1930 |
| 1,813,591 | Ulrey | July 7, 1931 |
| 1,864,076 | Legg | June 21, 1932 |
| 2,170,130 | Denneen et al. | Aug. 22, 1939 |
| 2,180,038 | Denneen et al. | Nov. 14, 1939 |
| 2,271,916 | Denneen et al. | Feb. 3, 1942 |
| 2,280,689 | Denneen et al. | Apr. 21, 1942 |
| 2,308,788 | Somes | Jan. 19, 1943 |
| 2,402,508 | Strickland | June 18, 1946 |
| 2,404,987 | Rudd | July 30, 1946 |